(12) United States Patent
Kimura et al.

(10) Patent No.: US 11,046,859 B2
(45) Date of Patent: Jun. 29, 2021

(54) COATING MATERIAL FOR HONEYCOMB STRUCTURE, OUTER PERIPHERAL COATING OF HONEYCOMB STRUCTURE, AND HONEYCOMB STRUCTURE WITH OUTER PERIPHERAL COATING

(71) Applicant: NGK INSULATORS, LTD., Nagoya (JP)

(72) Inventors: Keisuke Kimura, Nagoya (JP); Suguru Kodama, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/800,423

(22) Filed: Feb. 25, 2020

(65) Prior Publication Data
US 2020/0277508 A1   Sep. 3, 2020

(30) Foreign Application Priority Data

Feb. 28, 2019   (JP) .............................. JP2019-036272

(51) Int. Cl.
| | | |
|---|---|---|
| *C09D 7/61* | (2018.01) | |
| *C09D 7/40* | (2018.01) | |
| *B01D 53/94* | (2006.01) | |
| *B01D 46/24* | (2006.01) | |
| *B01J 35/04* | (2006.01) | |
| *B01J 21/12* | (2006.01) | |
| *B01J 27/224* | (2006.01) | |
| *C08K 13/04* | (2006.01) | |
| *C08K 7/10* | (2006.01) | |
| *C09D 121/02* | (2006.01) | |

(52) U.S. Cl.
CPC ....... *C09D 121/02* (2013.01); *B01D 46/2462* (2013.01); *B01D 53/94* (2013.01); *B01J 21/12* (2013.01); *B01J 27/224* (2013.01); *B01J 35/04* (2013.01); *C09D 7/61* (2018.01); *C09D 7/70* (2018.01); *B01D 2255/9155* (2013.01); *B01D 2279/30* (2013.01); *C08K 7/10* (2013.01); *C08K 13/04* (2013.01); *C08K 2201/004* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 5,188,779 A | 2/1993 | Horikawa et al. | |
| 5,494,881 A * | 2/1996 | Machida | F01N 3/2828 502/439 |
| 5,629,067 A | 5/1997 | Kotani et al. | |
| 2014/0296059 A1 * | 10/2014 | Suenobu | B01J 23/002 502/60 |
| 2017/0044066 A1 * | 2/2017 | Bubb | B01J 23/02 |

FOREIGN PATENT DOCUMENTS

| | | | |
|---|---|---|---|
| JP | H05-269388 A1 | 10/1993 | |
| JP | 2604876 B2 | 4/1997 | |

* cited by examiner

*Primary Examiner* — David Sample
*Assistant Examiner* — Elizabeth Collister
(74) *Attorney, Agent, or Firm* — Burr & Brown, PLLC

(57) ABSTRACT

A coating material for a honeycomb structure, the coating material containing: from 1% by mass to 10% by mass of first ceramic fibers having an average axial length of from 80 μm to 200 μm in an inorganic raw material; and from 0.1% by mass to 15% by mass of second ceramic fibers having an average axial length of from 50 μm to 70 μm in the inorganic raw material.

12 Claims, 2 Drawing Sheets

COATING MATERIAL FOR HONEYCOMB STRUCTURE, OUTER PERIPHERAL COATING OF HONEYCOMB STRUCTURE, AND HONEYCOMB STRUCTURE WITH OUTER PERIPHERAL COATING

FIELD OF THE INVENTION

The present invention relates to a coating material for a honeycomb structure, a peripheral coating of a honeycomb structure, and a honeycomb structure with a peripheral coating. More particularly, the present invention relates to a coating material for a honeycomb structure, a peripheral coating of a honeycomb structure, and a honeycomb structure with a peripheral coating, which effectively suppresses cracking in the outer peripheral coating during drying and heat treatment while improving toughness of the outer peripheral coating of the honeycomb structure.

BACKGROUND OF THE INVENTION

Honeycomb structures made of heat-resistant ceramics are used as supports for attaching catalysts for purification of harmful substances such as nitrogen oxide (NOx) and carbon monoxide (CO) in an exhaust gas of a motor vehicle, or as filters for collecting particulate matters (hereinafter referred to as PMs) in an exhaust gas. The ceramic honeycomb structure has thin partition walls and low mechanical strength due to high porosity. Therefore, for the purpose of reinforcing strength and preventing damage, an outer periphery of the honeycomb structure (cell structure) that has been ground to have a predetermined diameter is coated with a slurry containing ceramic powder (hereinafter referred to as a coating material), dried or fired to provide an outer wall (e.g., see Patent Documents 1 and 2).

The honeycomb structure used for the filters has a structure where a plurality of cells that form fluid flow paths partitioned and formed by porous partition walls made of silicon carbide (SiC) or the like are arranged so as to be parallel to each other in a central axis direction. In such a honeycomb structure, ends of adjacent cells are alternately plugged (in a checkered pattern) to obtain a filter capable of collecting PMs.

That is, in the honeycomb structure thus plugged, when an exhaust gas flows into a predetermined cell (an inflow cell) from one end, the exhaust gas passes through the porous partition walls and moves to an adjacent cell (an outflow cell), before being discharged. As the exhaust gas permeates the partition walls, the partition walls function as filtration layers so that PMs contained in the exhaust gas are collected.

A proposed countermeasure to prevent damage to such a filter is to join a plurality of honeycomb-shaped segments (honeycomb segments) to form a honeycomb structure for a filter, rather than to produce the entire filter with a single honeycomb structure. More particularly, a plurality of honeycomb segments are integrally joined by a readily deformable bonding material having a low elastic modulus to form a segmented structure, thereby dispersing and relaxing thermal stress acting on the honeycomb structure during regeneration to improve thermal shock resistance.

CITATION LIST

Patent Literatures

Patent Document 1: Japanese Patent Application Publication No. H05-269388 A

Patent Document 2: Japanese Patent No. 2604876 B

SUMMARY OF THE INVENTION

In order to improve toughness of the coating material for forming the outer wall (i.e., the coating) of such a honeycomb structure, a means for adding fibers is known as one of main raw materials. In this case, fiber having a small diameter and a large aspect ratio is preferably used. However, such fiber is defined as WHO fiber, which has a drawback that it is easily sucked into a human body, causing a problem of safety. It is necessary to use higher safety fiber having a thicker fiber diameter and a smaller aspect ratio, that is, fiber containing no WHO fiber, although it is inferior in fracture toughness.

In order to improve the toughness of the outer peripheral coating of the honeycomb structure, it is considered that the thickness of the coating is increased. However, it has a risk that cracking due to drying tends to occur (for example, for the conventional outer peripheral coating, cracking due to drying tends to become remarkable for a thickness of 0.25 mm or more).

Therefore, the cracking due to drying can be suppressed by adding fibers to the coating material, but this countermeasure also causes the following problems:

First, when fibers are added, there are problems that fluidity of the slurry of the coating material is lowered, the outer peripheral coating surface is roughened or the fibers are clogged, thereby decreasing productivity. Moreover, when the fiber length of the fibers is too long, the fibers are oriented in one direction when applied, causing a problem that an effect of suppressing cracks cannot be sufficiently obtained. Finally, when the fibers are added, there is a problem that a ratio of silicon carbide (SiC) having color developability for the laser is relatively lowered, thereby decreasing the color developability of laser printing.

The present invention has been made in view of the above problems. A purpose of the present invention is to provide a coating material for a honeycomb structure, a peripheral coating of a honeycomb structure, and a honeycomb structure with a peripheral coating, which effectively suppresses cracking in the outer peripheral coating during drying and heat treatment while improving toughness of the outer peripheral coating of the honeycomb structure.

As a result of intensive studies, the present inventors have found that the above problems can be solved by using two types of ceramic fibers each having a specified average length in an axial direction in a coating material. Thus, the embodiments of the present invention are illustrated as follows:

(1)

A coating material for a honeycomb structure, the coating material containing: from 1% by mass to 10% by mass of first ceramic fibers having an average axial length of from 80 μm to 200 μm in an inorganic raw material; and from 0.1% by mass to 15% by mass of second ceramic fibers having an average axial length of from 50 μm to 70 μm in the inorganic raw material.

(2)

The coating material for the honeycomb structure according to (1), wherein the first ceramic fibers have a sedimentation volume of from 1.8 mL/g to 5.0 mL/g, and the second ceramic fibers have a sedimentation volume of from 0.7 mL/g to 1.8 mL/g.

(3)

The coating material for the honeycomb structure according to (1) or (2), wherein the first ceramic fibers have a long axis to short axis ratio (long axis/short axis) of from 12 to 50, and the second ceramic fibers have a long axis to short axis ratio (long axis/short axis) of from 7 to 18.

(4)

The coating material for the honeycomb structure according to any one of (1) to (3), further containing a colloidal oxide with a dispersed polymer.

(5)

The coating material for the honeycomb structure according to (4), wherein the polymer is latex.

(6)

The coating material for the honeycomb structure according to (4), wherein the colloidal oxide is colloidal silica.

(7)

The coating material for the honeycomb structure according to any one of (1) to (6), further containing from 0.1% by mass to 10% by mass of at least one selected from titanium oxide and aluminum nitride.

(8)

An outer peripheral coating of a honeycomb structure, the outer periphery coating containing: from 1% by mass to 10% by mass of first ceramic fibers having an average axial length of from 80 μm to 200 μm in an inorganic raw material; and from 0.1% by mass to 15% by mass of second ceramic fibers having an average axial length of from 50 μm to 70 μm in the inorganic raw material.

(9)

The outer peripheral coating of the honeycomb structure according to (8), wherein the first ceramic fibers have a long axis to short axis ratio (long axis/short axis) of from 12 to 50, and the second ceramic fibers have a long axis to short axis ratio (long axis/short axis) of from 7 to 18.

(10)

The outer peripheral coating of the honeycomb structure according to (8) or (9), further containing from 0.1% by mass to 10% by mass of at least one selected from titanium oxide and aluminum nitride.

(11)

The outer peripheral coating of the honeycomb structure according to any one of (8) to (10), wherein the outer peripheral coating has a thickness of from 0.05 mm to 4.0 mm.

(12)

A honeycomb structure with an outer peripheral coating, the honeycomb structure comprising the outer periphery coating of the honeycomb structure according to any one of (8) to (11).

According to an embodiment of the present invention, it is possible to provide a coating material for a honeycomb structure, a peripheral coating of a honeycomb structure, and a honeycomb structure with a peripheral coating, which effectively suppresses cracking in the outer peripheral coating during drying and heat treatment while improving toughness of the outer peripheral coating of the honeycomb structure.

DETAILED DESCRIPTION OF THE INVENTION

Hereinafter, embodiments of a coating material for a honeycomb structure, an outer peripheral coating of a honeycomb structure, and a honeycomb structure with an outer peripheral coating according to the present invention will be described with reference to the drawings. However, it will be appreciated that various changes, modifications, and improvements may be made based on knowledge of a person skilled in the art without departing from the scope of the present invention.

(1. Honeycomb Structure)

Figure 1:
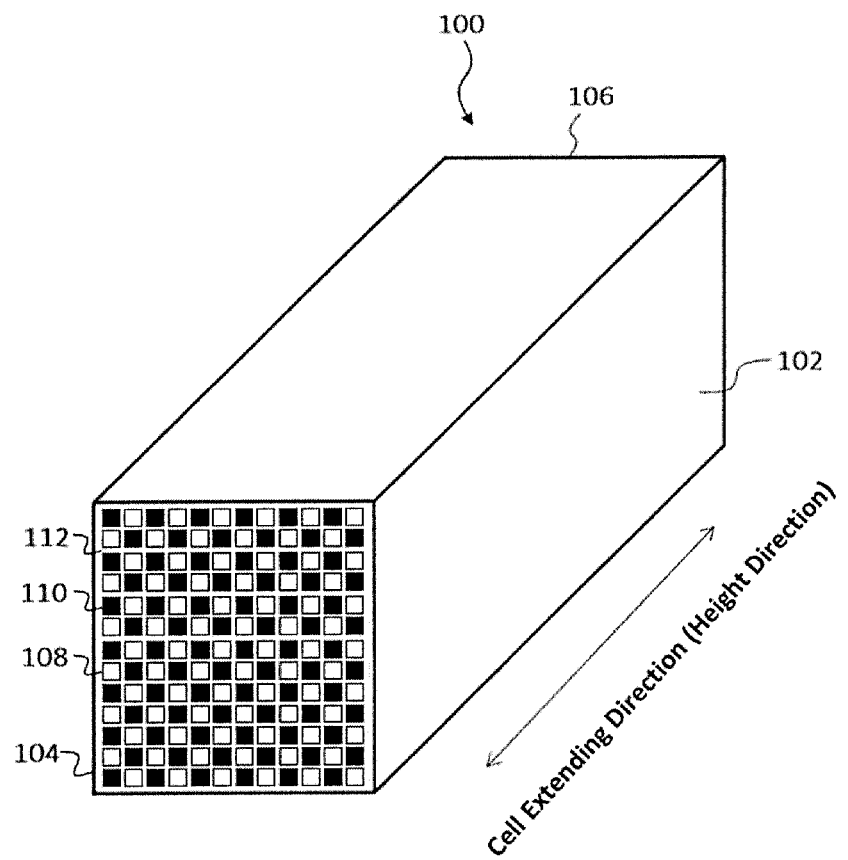
FIG. 1 is a view showing an example of a honeycomb structure according to the present invention.

FIG. 1 is a perspective view schematically showing a honeycomb structure according to an embodiment of the present invention. A honeycomb structure 100 as shown includes: an outer peripheral side wall 102; a plurality of first cells 108 disposed on an inner side of the outer peripheral side wall 102, the first cells 108 extending in parallel from a first end face 104 to a second end face 106, the first end faces being opened, and the second end face 106 being plugged; and a plurality of second cells 110 disposed on the inner side of the outer peripheral side wall 102, the second cells extending in parallel from the first end face 104 to the second end face 106, the first end face 104 being plugged and the second end face 106 being opened. Further, the illustrated honeycomb structure 100 includes porous partition walls 112 that define the first cells 108 and the second cells 110, each first cell 108 and each second cell 110 being alternately disposed so as to be adjacent to each other via each partition wall 112. The two end faces form a checkered pattern. In the honeycomb structure 100 according to the illustrated embodiment, all the first cells 108 are adjacent to the second cells 110, and all the second cells 110 are adjacent to the first cells 108. However, all of the first cells 108 may not necessarily be adjacent to the second cells 110, and all of the second cells 110 may not necessarily be adjacent to the first cells 108. The number, arrangement, shape, and the like of the cells 108 and 110 and the thickness of the partition wall 112 are not limited, and can be appropriately designed as needed.

A material of the honeycomb structure is not particularly limited. However, since the honeycomb structure should be a porous body having a large number of pores, examples of the material that can be suitably used include sintered bodies made of ceramics of silicon carbide, a silicon-silicon carbide-based composite material, or a silicon carbide-cordierite-based composite material, in particular sintered bodies mainly based on a silicon-silicon carbide composite material or silicon carbide. As used herein, the "silicon carbide-based" means that the honeycomb structure 100 contains 50% by mass or more of silicon carbide relative to the entire honeycomb structure. The phrases "honeycomb structure 100 mainly based on a silicon-silicon carbide composite" means that the honeycomb structure 100 contains 90% by mass or more of the silicon-silicon carbide composite (total mass) relative to the entire honeycomb structure. Here, it is preferable that the silicon-silicon carbide composite material contain silicon carbide particles as an aggregate and silicon as a binder for bonding the silicon carbide particles, and a plurality of silicon carbide particles be linked by silicon so as to form pores between the silicon carbide particles. Further, the phrase "honeycomb structure 100 mainly based on silicon carbide" means that the honeycomb structure 100 contains 90% by mass or more of silicon carbide (total mass) relative to the entire honeycomb structure.

A cell shape of the honeycomb structure is not particularly limited. It is preferably a polygon, such as a triangle, a quadrangle, a pentagon, a hexagon, an octagon, a circle, or an ellipse in a cross section orthogonal to the central axis, or it may be other irregular shapes.

Also, an outer shape of the honeycomb structure is not particularly limited. Preferably, it is a pillar shape with circular end faces (circular pillar shape), a pillar shape with oval end faces, or a pillar shape with polygonal (square, pentagonal, hexagonal, heptagonal, octagonal, etc.) end faces, or the like. The size of the honeycomb structure is not particularly limited. Preferably, the length in the central axis direction is from 40 to 500 mm. Further, for example, when the honeycomb structure has a cylindrical outer shape, each end face preferably has a radius of from 50 to 500 mm.

The partition walls of the honeycomb structure preferably have a thickness of from 0.15 to 0.50 mm, and more preferably 0.175 to 0.45 mm, in terms of ease of production. For example, if the thickness is less than 0.15 mm, the strength of the honeycomb structure may be reduced, and if the thickness is more than 0.50 mm, pressure loss may be increased when the honeycomb structure is used as a filter. In addition, the thickness of the partition wall is an average value measured by a method of observing an axial cross section with a microscope.

The partition walls forming the honeycomb structure preferably have a porosity of from 30 to 70%, and more preferably from 40 to 65%, in terms of ease of production. If the porosity is less than 30%, pressure loss may be increased, and if the porosity is more than 70%, the honeycomb structure may become brittle and be easily chipped.

The porous partition walls preferably have an average pore diameter of from 5 to 30 µm, and more preferably from 10 to 25 µm. If the average pore diameter is less than 5 µm, pressure loss may be increased even if a little amount of particulate matters is deposited when used as a filter, and if the average pore diameter is greater than 30 µm, the honeycomb structure may become brittle and be easily chipped. As used herein, the "average pore diameter" and "porosity" mean an average pore diameter and porosity measured by the mercury intrusion method.

The honeycomb structure has a cell density such as, but not particularly limited to, preferably in a range of from 5 to 63 cells/cm$^2$, and more preferably in a range of from 31 to 54 cells/cm$^2$.

Such a honeycomb structure is produced by forming a green body containing the ceramic raw material into a honeycomb shape having partition walls that define a plurality of cells penetrated from one end face to the other end face to form flow paths for a fluid to prepare a honeycomb formed body, and drying the honeycomb formed body and then firing it. When such a honeycomb structure is used as the honeycomb structure according to the present embodiment, after forming or firing, an outer periphery of the honeycomb formed body (honeycomb structure) is ground to have a predetermined shape, and the honeycomb structure with the ground outer periphery is coated with a coating material to form a peripheral coating. In the honeycomb structure according to the present embodiment, for example, a honeycomb structure having an outer periphery may be used without grinding the outer periphery of the honeycomb structure, and the outer peripheral surface of the honeycomb structure having the outer periphery (that is, a further outer side of the outer periphery of the honeycomb structure) may be further coated with the above coating material to form an outer peripheral coating. That is, in the former case, only the outer periphery coating made of the coating material according to the present embodiment is disposed on the outer peripheral surface of the honeycomb structure, whereas in the latter case, an outer peripheral wall having a double layer structure is formed, in which the outer peripheral coating comprised of the coating material according to the present embodiment has been further laminated onto the outer peripheral surface of the honeycomb structure.

It should be noted that the honeycomb structure is not limited to an integrated honeycomb structure in which the partition walls are integrally formed. For example, although not shown, the honeycomb structure may be a honeycomb structure in which pillar-shaped honeycomb segments having porous partition walls that define a plurality of cells serving as flow paths for a fluid are combined via bonding material layers (which may be, hereinafter, referred to as a "joined honeycomb structure").

Further, the honeycomb structure may have a structure in which one opened end portions of predetermined cells and the other opened end portions of the remaining cells among the plurality of cells may be plugged with plugged portions. Such a honeycomb structure can be used as a filter for purifying an exhaust gas (a honeycomb filter). Such plugged portions may be disposed after forming the outer peripheral coating, or may be disposed in a state before forming the outer peripheral coating, i.e., at a stage of producing the honeycomb structure.

It should be noted that such plugged portions may employ those having the same configuration as that used for plugged portions of the conventionally known honeycomb structure.

Further, the honeycomb structure used for the honeycomb structure according to the present embodiment may support a catalyst on at least one of the surfaces of the partition walls and the interiors of the pores of the partition walls. Thus, the honeycomb structure according to the present embodiment may be structured as a catalyst body that supports a catalyst, or as a catalyst supported filter that supports a catalyst for purifying an exhaust gas (for example, a diesel particulate filter (hereinafter also referred to as "DPF")).

A type of the catalyst is not particularly limited and can be appropriately selected depending on the purpose and application of the honeycomb structure. When used as the DPF, examples of the catalyst can include an oxidation catalyst for oxidizing and removing soot and the like in an exhaust gas, a NOx selective reduction catalyst (SCR) and a NOx storage reduction catalyst for removing harmful components such as NOx contained in the exhaust gas, and the like. In addition, a method for supporting the catalyst is not particularly limited, and it can be carried out according to the conventional method for supporting the catalyst on the honeycomb structure.

The respective fired honeycomb structures can be used as honeycomb segments, and the side surfaces of the honeycomb segments can be joined together via bonding materials for integration to form a honeycomb structure in which the honeycomb segments have been joined together. For example, the honeycomb structure in which the honeycomb segments are joined together can be produced as follows. The bonding material is applied to a joining surface (a side surface) while attaching a bonding material adhesion preventing masks to both the end faces of each honeycomb segment.

These honeycomb segments are then arranged adjacent to each other such that the side surfaces of the honeycomb segments face each other, and the adjacent honeycomb segments are pressure-bonded to each other and then dried by heating. A honeycomb structure in which the side surfaces of adjacent honeycomb segments are joined together via the bonding materials is thus produced. For the honeycomb structure, the outer peripheral portion may be ground to have a desired shape (for example, a cylindrical shape), the outer peripheral surface may be coated with the coating material and then dried by heating to form the outer peripheral wall.

The bonding material adhesion preventing mask is made of any material, including, but not particularly limited to, for example, synthetic resins such as polypropylene (PP), polyethylene terephthalate (PET), polyimide, or Teflon®. The mask preferably includes an adhesive layer, and a material of the adhesive layer is preferably an acrylic resin, a rubber-based material (for example, rubber mainly based on natural rubber or synthetic rubber), or a silicon-based resin.

As the bonding material adhesion preventing mask, for example, an adhesive film having a thickness of from 20 to 50 μm can be preferably used.

Examples of the bonding material that can be used includes those prepared by mixing ceramic powder, a dispersion medium (e.g., water) and optionally additives such as a binder, a deflocculating agent and a foamed resin. The ceramic may be preferably a ceramic containing at least one selected from the group consisting of cordierite, mullite, zircon, aluminum titanate, silicon carbide, silicon nitride, zirconia, spinel, indialite, sapphirine, corundum, and titania, and more preferably the same material as that of the honeycomb structure. Examples of the binder include polyvinyl alcohol, methyl cellulose (MC), and carboxymethyl cellulose (CMC).

(2. Coating Material for Honeycomb Structure)

The coating material for the honeycomb structure according to the present embodiment contains from 1 to 10% by mass of first ceramic fibers having an average axial length of from 80 to 200 μm in an inorganic raw material, and from 0.1 to 15% by mass of second ceramic fibers having an average axial length of from 50 to 70 μm in an inorganic raw material. As used herein, the expression "in an inorganic raw material" means that when the coating material contains an organic raw material, the percent by mass in an aggregate (that is, the inorganic raw material) excluding the organic raw material is calculated. Examples of a material of the ceramic fibers include alumina ($Al_2O_3$), silica ($SiO_2$), mullite ($3Al_2O_3 \cdot 2SiO_2$), alumina silicate ($xAl_2O_3 \cdot ySiO_2$), and the like.

When applied to the outer peripheral surface of the honeycomb structure and dried or fired after drying to form the outer peripheral coating, the coating material according to the present embodiment can provide higher toughness, as well as effectively suppress cracking. The reason is that the addition of the ceramic fibers increases fracture toughness, and even if cracking occurs due to impact, the cracking is not likely to develop and generate pinholes.

The pinholes refer to a state where minute holes or peelings are generated on the surface of the coating material due to external vibration, impact or shock, whereby the honeycomb structure underlying the coating material is exposed. Here, if the fiber length of the ceramic fibers is too long, the ceramic fibers will be oriented in one direction when applied, so that the effect of suppressing cracking cannot be sufficiently obtained. By combining ceramic fibers having a longer fiber length with those having a shorter fiber length, cracking due to drying can be suppressed even if the thickness of the coating is increased since the shorter fibers are difficult to be oriented. Therefore, it is important to use first ceramic fibers having a relatively longer fiber length of an average axial length of from 80 to 200 μm in combination with second ceramic fibers having a relatively shorter fiber length of an average axial length of from 50 to 70 μm.

Figures 2A, 2B, 2C:
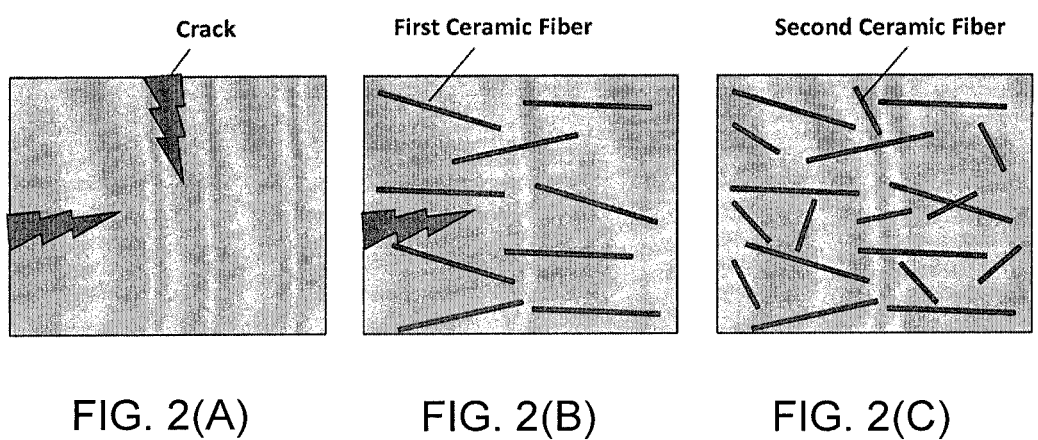
FIGS. 2(A)-2(C) are image diagrams showing a relationship between ceramic fibers and cracking due to drying in a coating material.

Specifically, as shown in FIG. 2, when the coating material does not contain ceramic fibers, cracks are easily generated from any direction (FIG. 2(A)). The containing of the ceramic fibers can provide an effect of suppressing the cracking. However, if the first ceramic fibers having a longer fiber length is used alone, the ceramic fibers are oriented in one direction when applied, and the effect of suppressing the cracking cannot be sufficiently obtained (FIG. 2(B)). So, by combining ceramic fibers having the longer fiber length with those having the shorter fiber length, as the short fibers become difficult to be oriented, cracking due to drying can be suppressed from any specific direction (FIG. 2(C)).

Further, other effects of using the combination of two types of ceramic fibers are such that the combination can render the fiber length distribution broad, provide fluidity, and allow the coating material to be smoothly applied. On the other hand, when the coating material contains only ceramic fibers having a single fiber length as in the prior art, the fluidity of the coating material slurry is lowered, so that coating failure or unevenness will easily occur.

The coating material for the honeycomb structure according to the present embodiment contains from 1 to 10% by mass of the first ceramic fibers having an average axial length of from 80 to 200 μm in the inorganic raw material. If the content of the first ceramic fibers is less than 1% by mass, the toughness is insufficient so that pinholes may occur. If the content of the ceramic fibers is more than 10% by mass, coatability of the coating material may be deteriorated.

The coating material for the honeycomb structure according to the present embodiment contains from 0.1 to 15% by mass of the second ceramic fibers having an average axial length of from 50 to 70 μm in the inorganic raw material. If the content of the second ceramic fibers is less than 0.1% by mass, the coatability of the coating material may be deteriorated. If the content of the second ceramic fibers is more than 15% by mass, readability of a barcode reader may be deteriorated, or the coatability may be deteriorated.

In order to further improve the effect of using the combination of two types of ceramic fibers, a sedimentation volume of the first ceramic fibers is preferably from 1.8 to 5.0 mL/g, and a sedimentation volume of the second ceramic fibers is preferably from 0.7 to 1.8 mL/g. By setting the sedimentation volumes of the two types of ceramic fibers to the above range, the fracture toughness of the honeycomb structure can be further improved, and the generation of cracking due to drying can also be further suppressed. From this viewpoint, the sedimentation volume of the first ceramic fibers is preferably from 2.0 to 4.0 mL/g, and the sedimentation volume of the second ceramic fibers is preferably from 1.0 to 1.8 mL/g.

Measurement of the sedimentation volume is carried out by placing a predetermined mass of a sample and ion-exchanged water in a graduated cylinder or the like, sufficiently stirring it, and then allowing it to stand, and reading the sedimentation volume of the ceramic fibers. The sedimentation volume per unit mass is calculated from the mass of the sample and the read volume.

In order to further improve the effect of using the combination of the two types of ceramic fibers, the first ceramic fibers preferably have a long axis to short axis ratio (long axis/short axis) of from 12 to 50, and the second ceramic fibers preferably have a long axis to short axis ratio (long axis/short axis) of from 7 to 18. By setting the long axis to short axis ratios of the two types of ceramic fibers to the above range, the fracture toughness of the honeycomb structure can be further improved, and the generation of cracking due to drying can also be further suppressed.

For the measurement of the long axis to short axis ratio, the long axis is measured using an SEM (scanning electron microscope) to obtain an average value. The short axis is also measured using SEM to obtain an average value. The measured long axis is divided by the short axis to calculate the long axis to short axis ratio.

In the present embodiment, the coating material for the honeycomb structure preferably contains a colloidal oxide in which a polymer is dispersed. By containing the colloidal oxide with the dispersed polymer, shrinkage of the coating material during drying can be suppressed, and the generation of cracks can be further suppressed.

From this viewpoint, it is more preferable to employ latex as the polymer and colloidal silica as the colloidal oxide. Such colloidal silica acts as an adhesive for the coating material, and can allow provide good adhesion to the honeycomb structure when the outer peripheral coating is formed on the outer periphery of the honeycomb structure by the coating material.

The content of colloidal silica is preferably from 20 to 35% by mass of the coating material, and more preferably from 25 to 30% by mass. This can allow improved coatability and improved viscosity during applying of the coating material, and can allow the outer peripheral coating formed to be securely bonded so as not to peel off from the honeycomb structure due to impact or the like.

The colloidal silica preferably has an average particle diameter of dispersed silica particles of from 10 to 30 nm, and more preferably from 15 to 25 nm, for example. The average particle diameter is calculated from a specific surface area and density of colloidal silica.

The coating material preferably further contains from 0.1 to 10% by mass of at least one selected from titanium oxide and aluminum nitride. That is, when the coating material contains the first and second ceramic fibers, a ratio of a component having higher color developability (for example, silicon carbide (SiC)) for a laser in the coating material is reduced, so that a contrast to a portion where the color development does not take place may be insufficient and visibility may be lower. Therefore, it may be difficult to read printing (marking). So, a component having a laser coloring effect such as titanium oxide or aluminum nitride is preferably added so as to enhance the contrast between a position where the color is developed by the laser and a position where the color is not developed. In particular, titanium oxide which is a white raw material and has a laser coloring effect are more preferable. When at least one selected from titanium oxide and aluminum nitride is contained, the lower limit of the content is set to 0.1% by mass in order to obtain the above effect. On the other hand, if the content of at least one selected from titanium oxide and aluminum nitride is more than 10% by mass, it will be difficult to expect further improvement of the laser coloring effect and a risk of increasing cracking due to drying. Therefore, the upper limit of the content is set to 10% by mass. In addition, the content as used herein indicates the content in the inorganic raw material as described above.

Further, as used herein, the term "printing" by laser is not limited to printing by characters, and it means that signs such as graphics, symbols and patterns, except for the characters, as well as identification information such as barcodes.

The coating material according to the present embodiment is in the form of a slurry in which the first and second ceramic fibers are dispersed by a dispersion medium.

The dispersion medium used for the coating material according to the embodiment may be any liquid capable of dispersing the first and second ceramic fibers. Water may be suitably used.

An amount of the dispersion medium is not particularly limited, as long as the amount is prepared so as to have sufficient coatability and viscosity when applying the coating material to the outer peripheral surface of the honeycomb structure (support) to form the outer peripheral coating. More particularly, the amount is preferably from 15 to 30% by mass, and more preferably from 20 to 25% by mass.

Furthermore, the coating material according to the embodiment may further contain an organic binder, clay, or the like. Examples of the organic binder include methyl cellulose, carboxymethyl cellulose, and biopolymers, and examples of the clay include bentonite and montmorillonite.

The coating material according to the embodiment can be produced by mixing the colloidal silica and other additives together with the dispersion medium to prepare a slurry or a paste.

Further, the viscosity of the coating material is measured using a rotary viscometer. Using a blade-type rotor, a shear stress value (Pa) when a rotation speed was 2.0 (1/s) is measured. The coating material is preferably adjusted such that the shear stress value is from 20 to 250 Pa, and more preferably from 30 to 200 Pa, and even more preferably from 50 to 150 Pa. This can allow easy application to the outer peripheral surface of the honeycomb structure. For example, if the viscosity is less than 20 Pa, the fluidity of the coating material is too high, and the coating material flows out when the coating material is applied, which may make it difficult to form a sufficiently thick outer peripheral coating. In particular, when the outer peripheral coating is thinned, the color development may decrease upon printing by a laser. On the other hand, if the viscosity is more than 250 Pa, the fluidity and wettability may be deteriorated, so that coatability may be deteriorated. Further, the formed outer peripheral coating may be prone to generate defects such as cracks and peeling.

Such a coating material can be applied to at least a part of the outer peripheral surface of the honeycomb structure, dried or fired after drying, thereby forming the outer peripheral coating containing the first and second ceramic fibers.

(3. Peripheral Coating of Honeycomb Structure)

The outer peripheral coating of the honeycomb structure according to the present invention contains from 1 to 10% by mass of the first ceramic fibers having an average axial length of from 80 to 200 μm in the inorganic raw material, and from 0.1 to 15% by mass of the second ceramic fibers having an average axial length of from 50 to 70 μm.

That is, the outer peripheral surface of the honeycomb structure having porous partition walls that define a plurality of cells can be coated with the coating material according to the present invention as described above, and drying the applied coating material to provide the outer peripheral coating of the honeycomb structure according to the present invention. In this case, higher toughness of the coating of the honeycomb structure can be obtained, as well as the generation of cracks can be effectively suppressed.

Other embodiments of the composition of the outer peripheral coating are the same as described above. That is, the long axis to short axis ratio (long axis/short axis) of the first ceramic fibers is preferably from 12 to 50, and the long axis to short axis ratio (long axis/short axis) of the second ceramic fibers is preferably from 7 to 18. Furthermore, it is preferable to contain from 0.1 to 10% by mass of at least one selected from titanium oxide and aluminum nitride.

First, a honeycomb structure having porous partition walls that define a plurality of cells is produced. For example, when a honeycomb structure made of silicon carbide (SiC) is produced, first, raw material powders such as silicon carbide (SiC) powder are mixed and prepared, and water is then added to the mixture, and mixed and kneaded to prepare a green body. In addition, a binder, a surfactant, a pore former and the like may be optionally added to the green body.

The resulting green body is then subjected to extrusion molding using an extruder equipped with a die to obtain a honeycomb formed body, and the resulting honeycomb molded body is dried.

The honeycomb formed body is then fired at a predetermined temperature to produce a honeycomb structure having porous partition walls that define a plurality of cells. In addition, when producing a honeycomb structure in which plugged portions are arranged at the openings of the cells, a plugging process may be carried out at a stage of producing the honeycomb formed body or the honeycomb structure.

For example, a method of forming plugged portions by plugging the cell openings is carried out by firstly masking the openings of part of cells on one end face of the honeycomb structure (or honeycomb formed body), and immersing that end face in a storage container containing a plugging material for forming plugged portions therein to insert the plugging material into the cells that have not been masked to form plugged portions. It should be noted that the plugging material for forming the plugged portions can be obtained by mixing ceramic raw materials, a surfactant, water, a sintering aid and the like, and optionally adding a pore former for increasing a porosity to form a slurry, and then kneading the slurry using a mixer or the like.

On the other end face of the honeycomb structure, the openings of the cells that have not been masked on the one end face (cells other than the part of the cells as described above) are masked, the other end face is immersed in a storage container containing the plugging material therein, and the plugging material is inserted into the cells that have not been masked to form plugged portions.

The method for masking the openings of the cells is not particularly limited. Examples of the method include a method of attaching an adhesive film to the entire end face of the honeycomb structure for a filter, and partially perforating the adhesive film. Suitable examples of the method include a method of attaching the adhesive film to the entire end face of the honeycomb structure for a filter and then perforating only portions corresponding to cells that are desired to form plugged portions with a laser. Examples of the adhesive film that can be suitably used include a film in which an adhesive is applied to one surface of the film made of a resin such as polyester, polyethylene, and a thermosetting resin.

Moreover, when the resulting honeycomb structure has been produced in a state where the outer peripheral wall has been formed on the outer peripheral surface, it is preferable that the outer peripheral surface be ground to remove the outer peripheral wall. In a subsequent step, the outer periphery of the honeycomb structure from which the outer peripheral wall has been thus removed is coated with the coating material to form the outer peripheral coating. Further, when the outer peripheral surface is ground, a part of the outer peripheral wall may be ground off, and the outer peripheral coating may be formed on that part by the coating material.

In addition to the above preparation of the honeycomb structure, the coating material for forming the outer peripheral coating of the honeycomb structure is prepared. The coating material can be prepared by mixing at least the first and second ceramic fibers so as to have the predetermined content ratio as previously described to form a slurry or a paste.

When the coating material is prepared by mixing the raw materials as described above, for example, it can be prepared using a biaxial rotary type vertical mixer.

The coating material may further contain colloidal silica, an organic binder, clay and the like. The organic binder is preferably used in an amount of from 0.05 to 0.5% by mass, and more preferably from 0.1 to 0.2% by mass. The clay is preferably used in an amount of from 0.2 to 2.0% by mass, and more preferably from 0.4 to 0.8% by mass. Preferred examples of the organic binder include methyl cellulose, hydroxypropoxyl methyl cellulose, carboxymethyl cellulose, and polyvinyl alcohol. Moreover, preferred examples of the clay include clay minerals such as bentonite and montmorillonite. Further, the coating material may further contain a dispersant such as polyethylene glycol, polyvinyl alcohol, polyoxyethylene alkyl ether, and polyethylene glycol fatty acid ester.

The coating material is applied onto the outer peripheral surface of the honeycomb structure previously produced, and the applied coating material is dried to form an outer peripheral coating. This can allow effective suppression of generation of cracks in the outer peripheral coating during drying/heat treatment.

The coating method of the coating material may be carried out, for example, by placing the honeycomb structure on a turntable to rotate it, and applying the coating material by pressing a blade-shaped coating nozzle against the honeycomb structure along the outer periphery of the honeycomb structure while discharging the coating material from the coating nozzle. This can allow the coating material to be applied with uniform thickness. Moreover, it can result in a decreased surface roughness of the formed outer peripheral coating, in improved appearance and in an outer peripheral coating that is hardly damaged by thermal shock.

When the outer peripheral surface of the honeycomb structure is ground to remove the outer peripheral wall, the entire outer peripheral surface of the honeycomb structure is coated with the coating material to form the outer peripheral coating. On the other hand, when the outer peripheral wall is present on the outer peripheral surface of the honeycomb structure, or when a part of the outer peripheral wall is removed, the coating material may be partially applied to form the outer peripheral coating, or the coating material, of course, may be applied to the entire outer peripheral surface of the honeycomb structure to form the outer peripheral coating.

The method for drying the applied coating material (that is, the undried outer peripheral coating) is not particularly limited. For example, in terms of preventing cracking due to drying, a method can be suitably used, in which the coating material may be dried at room temperature as needed, and then maintained at 400 to 700° C. for 10 minutes or more to remove moisture and organic substances.

Further, when the openings of the cells of the honeycomb structure have not been previously plugged, the openings of the cells may be plugged after forming the outer peripheral coating.

Furthermore, the outer peripheral surface of the resulting honeycomb structure is irradiated with a laser, whereby the silicon carbide powder contained in the coating material is colored. Therefore, the resulting outer peripheral coating of the honeycomb structure may be irradiated with laser light to print (mark) product information or the like.

Suitable examples of a laser beam used for marking with the laser include a carbon dioxide gas ($CO_2$) laser, a YAG laser, and a YVO4 laser. Laser conditions for irradiation with the laser beam can be appropriately selected according to the type of laser used. For example, when the $CO_2$ laser is used, the marking is preferably carried out at an output of from 15 to 25 W, and at a scan speed of from 400 to 600 mm/s. By this marking process, the irradiated portion is colored so as to present dark color such as black to green, so that a contrast to a non-irradiated portion due to coloring can be extremely improved.

When the catalyst is supported on the honeycomb structure, the printed portion is not deteriorated even after printing by the laser, so that the printing can be well read even after supporting the catalyst. In addition, the supporting method of the catalyst is not particularly limited, and it can be carried out in accordance with the catalyst supporting method conventionally carried out in the production method of the honeycomb structure.

In the present embodiment, the thickness of the outer peripheral coating of the honeycomb structure is preferably from 0.05 to 4.0 mm. If the thickness of the outer peripheral coating is less than 0.05 mm, the honeycomb structure may be exposed or pinholes may be generated in the outer peripheral coating, and if the thickness of the outer peripheral coating is more than 4.0 mm, it may deviate from the dimensional tolerance, or the pressure loss may increase.

(4. Honeycomb Structure with Outer Peripheral Coating)

A honeycomb structure with an outer peripheral coating according to the present invention has the outer peripheral coating of the honeycomb structure according to the present invention. The composition of the coating material for forming the outer peripheral coating, the composition of the outer peripheral coating, and the means for forming the outer peripheral coating are the same as described above.

EXAMPLES

Hereinafter, while the present invention is specifically described based on Examples, the present invention is not limited to these Examples.

Production of Honeycomb Structure

A molding aid, a pore former, and water were added to silicon-silicon carbide raw material powders mixed such that a composition after firing was silicon carbide: silicon metal=80:20, and mixed and kneaded to prepare a green body. The resulting green body was extruded to produce a cuboid unfired honeycomb formed body having a length of 42 mm, a width of 42 mm, and a height of 141 mm, and the honeycomb formed body was dried and fired to prepare a honeycomb segment.

For the 16 honeycomb segments, an adhesive face of a PET mask (having a thickness of 70 μm) was then attached to each of the entire end faces of the honeycomb segments. A paste bonding material containing silicon carbide (SiC) powder and a binder was applied to the side surface of each honeycomb segment so as to have a thickness of 1 mm to form a coating layer. Another honeycomb segment was then placed on the honeycomb segment such that the coated layer was in contact with the side surface. This step was then repeated to produce a honeycomb segment laminate composed of a total of 16 honeycomb segments combined to have 4 pieces in lengthwise×4 pieces in crosswise. Subsequently, a pressure was applied from the outside, followed by drying at 140° C. for 2 hours to provide a honeycomb structure with joined honeycomb segments. The masks were removed from each honeycomb segment.

The outer peripheral surface of the resulting honeycomb structure was ground to remove the outer peripheral wall. This honeycomb structure (after removing the outer peripheral wall) had a cylindrical shape with a diameter of 165 mm and a length of 141 mm, and had a porosity of 41% (a low porosity honeycomb), a partition wall thickness of 0.30 mm, and a cell density of 46 cells/cm$^2$.

A coating material was prepared, which had a composition of 40% by mass of silicon carbide, 25% by mass of colloidal silica, 20% by mass of alumina, and 15% by mass of cordierite, as an aggregate, and which further contained first and second ceramic fibers as shown in Table 1 for some Examples, the ceramic fibers being crystalline alumina fibers having a ratio of alumina and silica of 72:28 and being contained in a certain proportion based on the aggregate. The coating material was applied onto the honeycomb structures produced in Production of Honeycomb Structure as described above, so as to have thicknesses of 0.5 mm and 2.0 mm, dried at 120° C. for 60 minutes using a hot air dryer and then subjected to a heat treatment in an electric furnace at 600° C. for 30 minutes to form an outer peripheral coating. An ease of working when applying the coating material (coatability), the presence or absence of cracks in the outer peripheral coating during drying and heat treatment (cracking due to drying), and the presence or absence of pinholes in the outer peripheral coating (fracture toughness) were evaluated as follows. The results are shown in Table 1.

In Table 1, the average length of the "First Ceramic Fiber" in the axial direction is 150 μm, and the long axis to short axis ratio is 25. The average length of the "Second Ceramic Fiber" in the axial direction is 60 μm.

Pinholes

A vibration test (ASTM Level II: corresponding to 2500 km land transportation) was conducted in the same packing form as that at the time of product shipment (both end faces were protected by dedicated plastic trays, and packaged by cardboard, stacked on a pallet, and shrink-winded as a whole). Whether or not pinholes were generated in the outer peripheral coating material of a product (N=18 to 24 pcs.) was visually evaluated. A case where no pinhole was generated was indicated by "OK", and a case where a pinhole(s) was/were generated was indicated by "NG".

Measurement of Pin Pressing Strength

A load is applied to the surface of the coating material having a thickness of 0.5 mm by a pin having a diameter of 1 mm, and a stress value is calculated from the weight at the time when the surface is broken. The pin pressing strength correlates with the strength of the coating material.

Four Points Bending Permissible Strain

A sample having 12 mm×16 mm×70 mm was prepared from a bulk body obtained by drying the coating material, and a load was applied under the conditions of a distance between external fulcrums of 60 mm, a distance between internal fulcrums of 20 mm, and a crosshead speed of 0.5 mm/min. The displacement from the time when the maximum bending stress was recorded after the load was applied to the time when a complete breakage was confirmed was defined as the four points bending permissible strain.

Cracking Due to Drying

The coating material was applied to the outer peripheral portions of the honeycomb structures so as to have thicknesses of 0.5 mm and 2.0 mm using an outer peripheral coating apparatus used for production of a mass-produced product. Five or more honeycomb structures with outer periphery coatings coated with the coating material were prepared and dried at 120° C. for 60 minutes using a hot air dryer. Whether or not cracking due to drying was generated on the surface of the outer peripheral coating material was visually confirmed for each thickness. A case where a generation rate of cracking due to drying was 0% was indicated by "○ (a single circle)", a case where a generation rate of cracking due to drying was 20% or less was indicated by "Δ (a triangle)", and a case where a generation rate of cracking due to drying was more than 20% was indicated by "X (a cross)".

Coatablity

The coating material was applied to the outer peripheral portion of the honeycomb structure so as to have a thickness of 0.5 mm using an outer peripheral coating apparatus used for production of a mass-produced product. In this case, a case where neither coating failure nor unevenness was not generated in the outer periphery coating was determined to be "Good", a case where the applying onto the outer peripheral coating was possible although coating failure and unevenness were slightly generated was determined to be "Acceptable", and case where coating failure and unevenness were remarkably generated was determined to be "Bad".

The results of evaluation for each Example and each Comparative Example are shown in Table 1. Comparative Examples 1 and 2 could not produce the peripheral coating having a thickness of 0.5 mm, so the stress value at a thickness of 0.1 mm is shown as a reference value. The expression "0.1 mm: 6 N" means that the measured stress value is 6 N when the thickness of the outer peripheral coating is 0.1 mm, and "0.1 mm: 4 N" means that the measured stress value is 4 N when the thickness of the outer peripheral coating is 0.1 mm. The example where "-" is indicated in the column of "Vibration Test Pinhole Generation" means that the index has not been evaluated.

TABLE 1

| | | Comp. 1 | Comp. 2 | Comp. 3 | Example 1 | Example 2 | Example 3 | Example 4 |
|---|---|---|---|---|---|---|---|---|
| WHO Fiber | Mass (% by mass) | 30 | | | | | | |
| First Ceramic Fiber (80-200 μm) | Mass (% by mass) | | 0.0 | 15.0 | 2.5 | 5.0 | 5.0 | 10.0 |
| | Sedimentation Volume (ml/g) | | — | 3.1 | 3.1 | 3.1 | 3.1 | 3.1 |
| | Long Axis/Short Axis Ratio | | — | 25 | 25 | 25 | 25 | 25 |
| Second Ceramic Fiber (50-70 μm) | Mass (% by mass) | | 0.0 | 0.0 | 2.5 | 5.0 | 2.5 | 0.1 |
| | Sedimentation Volume (ml/g) | | — | — | 1.4 | 1.4 | 1.4 | 1.4 |
| | Long Axis/Short Axis Ratio | | — | 11 | 11 | 11 | 11 | 11 |
| Fracture Toughness | Pin Pressing Strength (N) | Production Not Possible (0.1 mm: 6N) | Production Not Possible (0.1 mm: 4N) | 22 | 17 | 25 | 20 | 20 |
| | 4 Points Bending Permissible Stain (mm) | 0.010 | 0.000 | 0.010 | 0.009 | 0.011 | 0.011 | 0.010 |
| | Vibration Test Pinhole Generation | 30% NG | 80% NG | — | — | All OK | All OK | All OK |
| Cracking due to drying ○: Rate of Cracking 0% Δ: Rate of Cracking ≤20% x: Rate of Cracking >20% | Coating Thickness 0.5 mm | Δ | x | ○ | ○ | ○ | ○ | ○ |
| | Coating Thickness 2.0 mm | x | x | Δ | Δ | ○ | ○ | ○ |
| | Evaluation | Bad | Bad | Acceptable | Acceptable | Good | Good | Good |
| Coatability | | | Good | Good | Bad | Good | Good | Good | Acceptable |
| Compliance with Regulation | Compliance with RCF Use Regulation | Non-conformed | Conformed | Conformed | Conformed | Conformed | Conformed | Conformed |

| | | Example 5 | Example 6 | Example 7 | Example 8 | Example 9 | Example 10 |
|---|---|---|---|---|---|---|---|
| WHO Fiber | Mass (% by mass) | | | | | | |
| First Ceramic Fiber (80-200 μm) | Mass (% by mass) | 7.5 | 5.0 | 1.0 | 5.0 | 5.0 | 5.0 |
| | Sedimentation Volume (ml/g) | 3.1 | 3.1 | 3.1 | 1.6 | 3.1 | 3.1 |
| | Long Axis/Short Axis Ratio | 25 | 25 | 25 | 25 | 25 | 25 |
| Second Ceramic Fiber (50-70 μm) | Mass (% by mass) | 7.5 | 10.0 | 15.0 | 2.5 | 2.5 | 2.5 |
| | Sedimentation Volume (ml/g) | 1.4 | 1.4 | 1.4 | 1.4 | 0.5 | 1.0 |
| | Long Axis/Short Axis Ratio | 11 | 11 | 11 | 11 | 11 | 6 |
| Fracture Toughness | Pin Pressing Strength (N) | 28 | 20 | 19 | 19 | 18 | 18 |
| | 4 Points Bending Permissible Stain (mm) | 0.011 | 0.009 | 0.008 | 0.007 | 0.010 | 0.009 |

TABLE 1-continued

| | | | | | | | |
|---|---|---|---|---|---|---|---|
| | Vibration Test Pinhole Generation | — | — | — | — | — | — |
| Cracking due to drying | Coating Thickness 0.5 mm | ○ | ○ | ○ | ○ | ○ | ○ |
| o: Rate of Cracking 0% | Coating Thickness 2.0 mm | ○ | ○ | x | x | Δ | Δ |
| Δ: Rate of Cracking ≤20% | | | | | | | |
| x: Rate of Cracking >20% | Evaluation | Good | Good | Acceptable | Acceptable | Acceptable | Acceptable |
| Coatability | | Acceptable | Good | Good | Good | Acceptable | Acceptable |
| Compliance with Regulation | Compliance with RCF Use Regulation | Conformed | Conformed | Conformed | Conformed | Conformed | Conformed |

Discussion

As can be seen from Table 1, the containing of from 1 to 10% by mass of the first ceramic fibers having an average axial length of from 80 to 200 μm in the inorganic raw material and from 0.1 to 15% by mass of the second ceramic fibers having an average axial length of from 50 to 70 μm in the inorganic raw material could effectively suppress cracking in the outer peripheral coating during drying and heat treatment while improving the toughness of the outer peripheral coating of the honeycomb structure. Furthermore, it was found that the coatability of the coating material was also improved.

Further, coating materials each having the same composition of the aggregate, and first and second ceramic fibers as that of Example 1, and further containing colloidal silica as shown in Table 2, were prepared, and applied to the outer peripheral surfaces of the honeycomb structures produced in Production of Honeycomb Structure as described above so as to have thicknesses of 0.5 mm and 2.0 mm, and then dried at 120° C. for 60 minutes using a hot air dryer, and then subjected to a heat treatment in an electric furnace at 600° C. for 30 minutes to form outer peripheral coatings. In this case, two types of colloidal silica were used, one with latex and the other with no latex. The presence or absence of cracks in the outer peripheral coating during the drying/heat treatment was evaluated by the method as described above (cracking due to drying evaluation). A case where a generation rate of cracking due to drying was 0% was indicated by "○ (a single circle)", a case where a generation rate of cracking due to drying was 20% or less was indicated by "Δ (a triangle)", and a case where a generation rate of cracking due to drying was more than 20% was indicated by "x (a cross)". The evaluation results are shown in Table 2. In Table 2, "% by mass" of colloidal silica means a percent by mass of colloidal silica in 100% of aggregate (silicon carbide, alumina, cordierite, colloidal silica) excluding the ceramic fibers.

TABLE 2

| | Example 1 | Example 11 | Example 12 | Example 13 |
|---|---|---|---|---|
| Colloidal Silica (% by mass) (With No Latex) | 20% | 0% | 0% | 0% |

TABLE 2-continued

| | | Example 1 | Example 11 | Example 12 | Example 13 |
|---|---|---|---|---|---|
| Colloidal Silica (% by mass) (With Latex) | | 0% | 20% | 25% | 29% |
| Cracking due to drying o: Rate of Cracking 0% | Coating Thickness 0.5 mm | ○ | ○ | ○ | ○ |
| Δ: Rate of Cracking ≤20% | Coating Thickness 2.0 mm | Δ | ○ | ○ | ○ |
| x: Rate of Cracking >20% | Evaluation | Acceptable | Good | Good | Good |

Discussion

A can be seen from Table 2, cracking due to drying could be further suppressed by containing the colloidal oxide with the dispersed polymer.

Further, coating materials were prepared, which had the same aggregate as that of each Example and had mass percentages of first and second ceramic fibers as shown in Table 3 (the compositions of the first and second ceramic fibers were the same as those of Examples), and which further contained titanium oxide as shown in Table 3. That coating materials were applied onto the outer peripheral surfaces of the honeycomb structures produced by Production of Honeycomb Structure as described above so as to have thicknesses of 0.5 mm and 2.0 mm, and then dried at 120° C. for 60 minutes using a hot air dryer, and then subjected to a heat treatment in an electric furnace at 600° C. for 30 minutes to form outer peripheral coatings. The presence or absence of cracks in each outer peripheral coating during the drying and heat treatment was evaluated by the method as described above. An outer peripheral coating where a generation rate of cracking due to drying was 0% was indicated by "○ (a single circle)", an outer peripheral coating where a generation rate of cracking due to drying was 20% or less was indicated by "Δ (a triangle)", and an outer peripheral coating where a generation rate of cracking due to drying was more than 20% was indicated by "x (a cross)". Further, a laser printing readability was evaluated as follows, and the results are shown in Table 3.

It should be noted that only Comparative Example 6 did not contain the first and second ceramic fibers.

Read Grade Evaluation 2D barcode laser printing was carried out on the outer peripheral surface of each honeycomb structure under conditions of an output of 20 W and a scanning speed of 500 mm/s using a $CO_2$ laser marker, and a contrast between a printed portion colored by the laser and a non-irradiated portion was evaluated by a reading test (Print Reading Test) using a bar code reader in accordance with ISO/IEC 15415. The printing and the reading test were carried out for ten or more samples. The evaluation was carried out according to the following criteria. The "Read Grade" in the following criteria is based on the ISO/IEC 15415 standard.

Read Grade A: the contrast is good and the printed portion can be well read.

Read Grades B to D: the printed portion is readable.

Read Grade F: the contrast between the printed portion and the non-irradiated portion is poor, and reading is difficult.

In addition, the read grade "A-B" in Table 3 indicates that there were both Grade A and Grade B as a result of evaluation for a plurality of samples.

TABLE 3

| | | Example 14 | Example 15 | Example 16 | Example 17 | Example 18 | Comp. 6 |
|---|---|---|---|---|---|---|---|
| Mass of Fiber (% by mass) (First Fiber/Second Fiber) | | 5.5/5.5 | 5.5/5.5 | 5.5/5.5 | 5.5/5.5 | 5.5/5.5 | 0.0/0.0 |
| Titanium Oxide (% by mass) | | 0.0 | 1.0 | 2.0 | 3.0 | 5.0 | 0.0 |
| Read Grade in Print Reading Test | | B | A-B | A-B | A | A | A-B |
| Cracking due to drying ○: Rate of Cracking 0% Δ: Rate of Cracking ≤20% x: Rate of Cracking >20% | Coating Thickness 0.5 mm | ○ | ○ | ○ | ○ | ○ | x |
| | Coating Thickness 2.0 mm | ○ | ○ | ○ | Δ | Δ | x |
| | Evaluation | Good | Good | Good | Acceptable | Acceptable | Bad |

Discussion

As can be seen from Table 3, the laser printing readability was improved by containing from 0.1% by mass to 10% by mass of titanium oxide. If the addition amount is more than 10%, the effect of improving the printability reaches a plateau. Therefore, the addition amount is set to 10.0% by mass or less to suppress the generation of cracking due to drying. Thus, the addition amount of at least one selected from titanium oxide and aluminum nitride is preferably from 0.1% by mass to 10.0% by mass, and more preferably from 0.5% by mass to 5.0% by mass.

DESCRIPTION OF REFERENCE NUMERALS 100 honeycomb structure
102 outer peripheral side wall
104 first end face
106 second end face
108 first cell
110 second cell
112 partition wall

The invention claimed is:

1. A coating material for a honeycomb structure, the coating material containing: from 1% by mass to 10% by mass of first ceramic fibers having an average axial length of from 80 μm to 200 μm in an inorganic raw material; and from 0.1% by mass to 15% by mass of second ceramic fibers having an average axial length of from 50 μm to 70 μm in the inorganic raw material.

2. The coating material for the honeycomb structure according to claim 1, wherein the first ceramic fibers have a sedimentation volume of from 1.8 mL/g to 5.0 mL/g, and the second ceramic fibers have a sedimentation volume of from 0.7 mL/g to 1.8 mL/g.

3. The coating material for the honeycomb structure according to claim 1, wherein the first ceramic fibers have a long axis to short axis ratio (long axis/short axis) of from 12 to 50, and the second ceramic fibers have a long axis to short axis ratio (long axis/short axis) of from 7 to 18.

4. The coating material for the honeycomb structure according to claim 1, further containing a colloidal oxide with a dispersed polymer.

5. The coating material for the honeycomb structure according to claim 4, wherein the polymer is latex.

6. The coating material for the honeycomb structure according to claim 4, wherein the colloidal oxide is colloidal silica.

7. The coating material for the honeycomb structure according to claim 1, further containing from 0.1% by mass to 10% by mass of at least one selected from titanium oxide and aluminum nitride in the inorganic raw material.

8. An outer peripheral coating of a honeycomb structure, the outer periphery coating containing: from 1% by mass to 10% by mass of first ceramic fibers having an average axial length of from 80 μm to 200 μm in an inorganic raw material; and from 0.1% by mass to 15% by mass of second ceramic fibers having an average axial length of from 50 μm to 70 μm in the inorganic raw material.

9. The outer peripheral coating of the honeycomb structure according to claim 8, wherein the first ceramic fibers have a long axis to short axis ratio (long axis/short axis) of from 12 to 50, and the second ceramic fibers have a long axis to short axis ratio (long axis/short axis) of from 7 to 18.

10. The outer peripheral coating of the honeycomb structure according to claim 8, further containing from 0.1% by mass to 10% by mass of at least one selected from titanium oxide and aluminum nitride in the inorganic raw material.

11. The outer peripheral coating of the honeycomb structure according to claim 8, wherein the outer peripheral coating has a thickness of from 0.05 mm to 4.0 mm.

12. A honeycomb structure with an outer peripheral coating, the honeycomb structure comprising the outer periphery coating of the honeycomb structure according to claim 8.

* * * * *